(12) United States Patent
Kamitani

(10) Patent No.: US 7,160,626 B2
(45) Date of Patent: Jan. 9, 2007

(54) COATED ARTICLE, COATING LIQUID COMPOSITION, AND METHOD FOR PRODUCING COATED ARTICLE

(75) Inventor: Kazutaka Kamitani, Osaka (JP)

(73) Assignee: Nippon Sheet Glass Company, Ltd., Osaka (JP)

( * ) Notice: Subject to any disclaimer, the term of this patent is extended or adjusted under 35 U.S.C. 154(b) by 284 days.

(21) Appl. No.: 10/472,289

(22) PCT Filed: Mar. 20, 2002

(86) PCT No.: PCT/JP02/02709

§ 371 (c)(1),
(2), (4) Date: Sep. 20, 2003

(87) PCT Pub. No.: WO02/074447

PCT Pub. Date: Sep. 26, 2002

(65) Prior Publication Data

US 2004/0105982 A1 Jun. 3, 2004

(30) Foreign Application Priority Data

Mar. 21, 2001 (JP) ............................. 2001-081067

(51) Int. Cl.
*B32B 9/04* (2006.01)
(52) U.S. Cl. ...................... 428/447; 428/689; 428/702
(58) Field of Classification Search ..................... None
See application file for complete search history.

(56) References Cited

U.S. PATENT DOCUMENTS 6,472,079 B1 * 10/2002 Hayashi et al. ............. 428/447
2004/0053058 A1 * 3/2004 Kamitani et al. ........... 428/429

FOREIGN PATENT DOCUMENTS

| DE | EP 294 830 A | * | 12/1988 |
| JP | 4-338137 A | | 11/1992 |
| JP | 8-239653 A | | 7/1996 |
| JP | 11-71682 A | | 12/1998 |
| WO | WO 01/09266 | * | 2/2001 |

* cited by examiner

*Primary Examiner*—Marc S. Zimmer
(74) *Attorney, Agent, or Firm*—Intellectual Property Law Group LLP; Otto O. Lee; Juneko Jackson

(57) ABSTRACT

The invention is an coated article composed of a substrate and an organic-inorganic composite film, which is coated on the substrate and has an oxide of a cation atom capable of forming an oxide network coated on the surface of the substrate, and the same has a part of oxygen of the oxide substituted by an organic group, wherein the organic-inorganic composite film includes alkaline metal oxides at a ratio of 0.1 through 30% of the total number of the alkaline metal atoms and the cation atoms expressed in terms of the number of alkaline metal atoms, and the article coated with a high-performance organic-inorganic composite film, is able to withstand outdoor uses and has high hardness.

5 Claims, No Drawings

COATED ARTICLE, COATING LIQUID COMPOSITION, AND METHOD FOR PRODUCING COATED ARTICLE

TECHNICAL FIELD OF THE INVENTION

The present invention relates to an article coated with an organic-inorganic composite film, which is formed on the surface of a substrate such as glass, ceramic, plastic or metal, a composition for coating an organic-inorganic composite film, and a method for producing a coated article.

BACKGROUND OF THE INVENTION

Such a technology has been known, by which the surface of a substrate is improved by providing an organic-inorganic composite film having an inorganic oxide and an organic group on the surface of glass and other matrices.

By coating a solution, in which silicon alkoxide, substituted silicon alkoxide having a part of alkoxyl group substituted by fluoroalkyl group, alcohol, water and acid (or a base) are blended, on the surface of a glass substrate and burning the same, glass having an organic-inorganic composite film having water repellency coated thereon has been disclosed in Japanese Unexamined Patent Application No. H4-338137.

An organic-inorganic composite film coated article having water repellency, which is treated by a composition in which a mixture of perfluoroalkylalkylsilane and completely hydrolyzable silane (for example, tetrachlorosilane) is dissolved in a solvent, preferably a non-water based solvent, has been known in Japanese Unexamined Patent Application No. H8-239653.

An organic-inorganic composite film coated article having water repellency, which is treated by a composition in which a compound containing a chlorosilyl group and a silane compound containing a fluoroalkyl group are dissolved in an alcohol-based solvent has been disclosed in Japanese Unexamined Patent Application No. H11-71682.

An organic-inorganic composite film in these technologies is produced by a so-called sol-gel method in which a solvent including a hydrolyzable silane compound and a silane compound having water repellent group are coated on a substrate and dried thereon. In the sol-gel method, since the solvent evaporation is progressed in line with formation of an oxide bonding, remarkably fine pores exist in a film when the temperature is 400° C. or less, and hardness of the film is not high. In order to remove the pores and to increase the hardness of the film, burning thereof at a temperature of 500 through 600° C. is indispensable. However, an organic group such as a water repellent group contributing to improvement of the surface is decomposed at such a temperature. Therefore, in the above-described technologies, drying and hardening of the film are carried out at 250° C. or less. The organic-inorganic composite film thus obtained does not become a film having high hardness as in oxides and ceramics that are obtained by, for example, a melting method although the obtained organic-inorganic composite film has oxides as the main compounds.

For example, where such an article coated with an organic-inorganic composition film is used outdoors, the article is exposed to such situations where sand is blown thereonto, and the film surface is easily impaired, resulting in a loss of the improved characteristics. Also, by wiping off the surface thereof to remove adhered dust, soil and sand, the film may be impaired and peeled off. Further, even in a case where no dust is adhered, minor damage occurs on the surface due to friction between a cloth made of hard fabric, a brush, etc., (for example, wiping off the window glass of a vehicle by a wiper, etc.,), wherein this damage fosters deterioration in the characteristics.

The present invention was developed in view of the above-described and other problems, and it is therefore an article of the invention to provide an article coated with an organic-inorganic composite film having high hardness which withstands outdoor uses, water repellency and/or other functional properties, and a coating liquid composition for producing this coated article, and a method for producing the coated article with excellent productivity.

DISCLOSURE OF THE INVENTION

The present inventor discovered that the hardness of an organic-inorganic composite film is increased in epoch-making proportions by providing alkali metal ions into an organic-inorganic composite film on the basis of the results of repeated research in order to solve the above-described object.

That is, the invention brings about a coated article composed of a substrate and an organic-inorganic composite film, which is coated on the surface of said substrate, and has an oxide of a cation atom capable of forming an oxide network, and having a part of oxygen of said oxide substituted by an organic group, wherein said organic-inorganic composite film includes alkali metal oxides at a ratio of 0.1 through 30% of the total number of said alkali metal atoms and said cation atoms expressed in terms of the number of said alkali metal atoms.

Generally, when forming an oxide film by a sol-gel method, there are many cases where metal alkoxide, for example, alkoxide of silicon (Si) is used as a starting material. In the sol-gel method, since evaporation of a solvent is promoted in line with formation of a metal by a dehydrating condensation action, for example, bonding (siloxane bonding) of silicon (Si) and oxygen (O), a porous silica film, which contains fine pores therein, is produced. The bonding of silicon with oxygen is covalent, wherein as siloxane bonding forms a three-dimensional structure to some degree in the stage of evaporation of a solvent since silicon is bonded with oxygen with large bonding energy, the structure thereof is suppressed from contracting even if a dehydrating condensation action is fostered thereafter, and portions where a solvent, alcohol generated by a hydrolysis reaction, and water generated by a dehydrating condensation reaction are evaporated remain as fine pores. In the fine pores, a silanol group, an alkoxyl group, water or alcohol exists. The hardness of the porous silica film is not very high because of its porous structure. Where the film is heated at a temperature of 500° C. or more, fine pores of the film become extinct, and the film is turned into a non-porous silica film which will have a high hardness. However, since an organic group having water repellency such as, for example, a fluoroalkyl group is decomposed at this heating temperature, fine pores of the film rarely become extinct when the heating temperature of the film is a temperature (for example, 300° C. or less) such as an organic group having water repellency is not decomposed, and the hardness of the film does not become high.

In the invention, an alkali metal oxide is introduced into an organic-inorganic composite film. Since an alkali metal is intensive in terms of ionic characteristics, by dissolving an alkali metal in a coating liquid for forming a film and causing the same to coexist along with a hydrolyzable metal compound (for example, silane compound) such as silicon alkoxide, the alkali metal may exist in a solvent in a state of ions even in the stage of evaporation of the solvent. Since the alkali metal (M) ions are monovalent, these react with a metal hydroxyl group (for example, silanol group), wherein if the metal is, for example, silicon (Si), it is finally bonded with oxygen (O) in the film as shown by the following structure (1), a bonding [O⁻ ⁺M] having a freer directivity in bonding in comparison with a bonding of [Si—O—Si] can be produced. Therefore, a structure of the organicinorganic composite film in which an alkali metal oxide is introduced becomes more easily deformable due to heat than the structure of a film not including any alkali metal oxide. As a result, according to the invention, the structure is deformed by drying or heating at a lower temperature than the decomposing temperature (250 through 300° C.) of an organic group contained in the organic-inorganic composite film, wherein a number of fine pores become extinct and the film becomes denser. Therefore, a film having a very high hardness can be brought about.

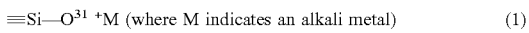
(1)

It is possible for an organic-inorganic composite film according to the invention to be caused to include an alkaline earth metal oxide. The alkaline earth metal is intensive in terms of ionic characteristics as in the alkali metal. By causing the composite film to include an alkaline earth metal oxide, it is possible to increase the abrasion-resisting property of the film without spoiling the low temperature hardening property by introduction of an alkali metal. Although the organic-inorganic composite film according to the invention includes an organic group as described later, the organic group exists on the surface at a higher density than in inner portion of the organic-inorganic composite film. The density of the organic group of the film surface is further heightened by doping of an alkaline earth metal oxide. As a result, functions of the organic group can be further increased. For example, where the organic group is, for example, a water repellent group, the contact angle of the film is further increased by doping of an alkaline earth metal oxide, wherein the rolling property of water drops can be further improved.

In the invention, lithium (Li), sodium (Na), potassium (K), rubidium (Rb), cesium (Cs), and francium (Fr) may be used as the above-described alkali metal. However, Li and Cs are preferably used in view of easy procurement and high solubility with respect to both water and alcohol. Also, calcium (Ca), magnesium (Mg), strontium (Sr), barium (Ba), radium (Ra), and beryllium (Be) are used as the above-described alkaline earth metal. However, Ca and Mg are preferably used in view of easy procurement, high solubility with respect to both water and alcohol, and no toxicity.

Where the content of an alkali metal oxide is very slight in the organic-inorganic composite film, an effect of hardening at low temperature cannot be obtained. To the contrary, where the content thereof is too high, segregation may arise to cause the alkali metal oxide to become non-uniform, whereby the hardness of the film is lowered. Therefore, the content thereof is expressed in terms of the number of alkali metal atoms, and is 0.1 through 30% of the total number of cation atoms and alkali metal atoms, and the above-described alkaline earth metal atoms described later constituting an oxide that forms networks of an organic-inorganic composite film, preferably 1 through 25%.

Where the content of an alkaline earth metal oxide is excessive in the organic-inorganic composite film, the alkaline earth metal oxide is segregated to become non-uniform, thereby lowering the hardness of the film. Therefore, the content thereof is expressed in terms of the number of alkaline earth metal atoms, and is preferably 0 through 30% of the total number of cation atoms that constitute network-forming inorganic oxides of the organic-inorganic composite film, the above-described alkali metal atoms and alkaline earth metal atoms, further preferably 0.1 through 30% thereof, and still further preferably 1 through 25% thereof. However, the total of the contents of alkali metal oxides and alkaline earth metal oxides is expressed in terms of the total number of the above-described alkali metal atoms and alkaline earth metal atoms, and is preferably 50% or less of the total number of the above-described cation atoms, alkali metal atoms, and alkaline earth metal atoms.

An organic-inorganic composite film according to the invention includes oxides of cation atoms by which oxide networks are formed. Silicon, titanium, zirconium, aluminum, germanium, tantalum, tin, antimony, cerium, lanthanum, tungsten, indium, and boron, etc., may be listed as the cation atoms. Among these constituents, silicon may be preferably used because condensates and crystal are in comparison rarely produced in a film during forming the same, and a film free from any crack can be easily obtained.

An organic-inorganic composite film according to the invention includes oxides of cation atoms by which oxide networks are formed, in which a part of oxygen in the oxide is substituted by an organic group. The organic group is not specially limited. However, a monovalent organic group is preferable. For example, an alkyl group such as, for example, a methyl group, ethyl group, isopropyl group, etc., phenyl group, vinyl group, aminopropyl group, acryl group, epoxy group, polyether group, and further a fluoroalkyl group, chloroalkyl group, etc., in which a part or all of hydrogen of a carbohydrate is substituted by fluorine or chlorine, may be listed. Among these groups, for example, the alkyl group and fluoroalkyl group provide the film with water repellency, the methyl group provides the same with a low friction property, and the aminopropyl group and polyether group provide the surface thereof with hydrophilicity.

These organic groups exist in a state where, in an organic-inorganic composite film, these are bonded with cation atoms (for example, silicon atoms) of an inorganic oxide (for example, SiO₂) that forms the networks thereof. Where the content of the organic groups is too slight, the organic groups do not contribute to reforming the surface of a substrate, wherein the film does not display appointed performance. Wherein the content thereof is the excessive, the film strength is decreased. Therefore, the content thereof is expressed in terms of the number of organic groups, and is preferably 0.001 times or more but less than 2 times the total number of cation atoms of an inorganic oxide that forms the networks thereof, the above-described alkali metal atoms, and alkaline earth metal atoms in an organic-inorganic composite film. Further preferably, the content is 0.01 times through one time. The organic group may be uniformly distributed in the thickness direction of the film. However, it may be composed of an inclined composition film whose density may change from the boundary side with the substrate to the outer surface thereof. For example, in order to cause the film to have water repellency, an alkyl group and/or fluoroalkyl group in the film are contained so that the number thereof becomes 50 through 100% of the total number of the organic groups, wherein it is further preferable in that a water repellent film having high durability performance is obtained together with an increase in the hardness of the film.

Thus, according to the invention, by containing alkali metal ions or alkali metal ions and alkaline earth metal ions, it is possible to obtain a film having a high hardness that cannot be obtained by prior arts, by drying or heating at a temperature lower than the decomposing temperature of an organic group contributing to reforming of the surface of a substrate. As a result, the durability performance of organic-inorganic compound films can be remarkably improved.

Such low temperature hardening performance is not impaired even in a case where transition metal ions, etc., are introduced into the film for the purpose of, for example, adding a feature of controlling the refractive index of the film and controlling the visible light transmissivity in addition to a reforming property brought about by the organic groups. That is, by causing the transition metal ions and alkali metal oxides (or both alkaline metal oxides and alkaline earth metal oxides) to coexist, which can manifest the target feature, it is possible to obtain a combined-function film that has very high hardness by drying and heating at a temperature less than 300° C. and can include a reforming property by an organic group and a feature brought about by the transition metal ions. It is possible to obtain an organic-inorganic composite film colored by doping, for example, cobalt oxide, iron oxide, nickel oxide, and copper oxide thereto.

Further, organic molecules such as coloring pigments, etc., can be included in the above composite film as in the above. However, it is preferable that the content of organic molecules other than those included as the organic groups is 5% or less by weight with respect to the film weight. If such organic molecules are doped more than the above, low temperature hardening performance may be lost.

If the film thickness is too thick, the film hardness becomes liable to be lowered. If the same is too thin, no effect of reforming the surface of a substrate can be obtained. Therefore, the film thickness is preferably 5 through 200 nm, further preferably 5 through 100 nm, and still further preferably 5 through 50 nm.

Further, the invention pertains to a composition for coating, including:

(a) an organic metal compound having an organic group of nonhydrolyzability, (b) an acid, and (c) an alkali metal compound, and if necessary, (d) a completely condensation-polymerizable or hydrolyzable/condensation-polymerizable compound, and (e) an alkaline earth metal compound.

It is preferable that the above-described constituent (a) is contained so that the number of atoms excluding the organic group is 0.1 through 99.8% with respect to the total number (However, excluding cation atoms in the organic group. This is applicable to the following description.) of cation atoms of the above-described constituents (a), (c), (d) and (e). Further preferably, the content ratio thereof is 1.0 through 90%. It is preferable that the above-described constituent (c) is contained so that the number of the alkali metal atoms becomes 0.1 through 30% with respect to the total number of cation atoms excluding the organic groups of the above-described constituents (a), (c), (d) and (e). Further preferably, the content ratio thereof is 1 through 25%. The above-described constituent (d) is a constituent for strengthening bonding between the film and a substrate. It is preferable that the constituent (d) is contained so that the number of cation atoms excluding the organic group becomes 0 through 99.7% with respect to the total number of cation atoms excluding the organic groups of the above-described constituents (a), (c), (d) and (e). Further preferably, the content ratio thereof is 1 through 88%. And, it is preferable that the above-described constituent (e) is contained so that the number of alkali metal atoms becomes 0.1 through 30% with respect to the total number of cation atoms excluding the organic groups of the above-described constituents (a), (c), (d) and (e). Further preferably, the content ratio thereof is 1 through 25%.

In the invention, the constituent (d) is not requisite. However, the constituent (d) may be dissolved in alcohol that is a general solvent. A compound that is completely hydrolyzable and condensation-polymerizable or a compound that is completely condensation-polymerizable may be widely used. That is, a compound that is completely hydrolyzable and condensation-polymerizable is a compound in which hydrolyzing groups are bonded to cation atoms, and in which the number of hydrolyzing groups is equal to that of cation atoms. Also, a compound that is completely condensation-polymerizable is a compound in which hydroxyl groups are bonded to cation atoms and in which the number of hydroxyl groups is equal to that of cation atoms. For example, alkoxide, hydroxide, chloride, nitride, etc., of cation atoms (silicon, titanium, zirconium, aluminum, germanium, tantalum, gallium, tin, antimony, cerium, lanthanum, tungsten, indium, scandium, yttrium, boron, etc., ), which are able to form oxide networks, may be listed as the above-described constituent (d) . Where reaction is very sensitive like alkoxide such as titanium, zirconium, aluminum, boron, etc., and it is difficult to obtain a uniform solution with only the same doped, these may be doped after turning the same into chelate by β diketone such as acetylacetone, etc. In a case of compounds that are not soluble in alcohol but are soluble in water, water may be doped as necessary. In detail, as to the above-described constituent (d), silicontetraalkoxide such as tetramethoxysilane, tetraethoxysilane, etc., titantetraalkoxide such as titantetraisopropoxide, titantetrabuthoxide, etc., zirconiumtetraalkoxide such as zirconiumtetraisopropoxide, zirconiumtetraethoxide, zirconiumtetrabuthoxide, etc., and compounds such as $H_3BO_3$, $ZrOCl_{12}$, $ZrO(NO_3)_2$, $AlCl_3$, $GeCl_4$, $TaCl_5$, $GaCl_3$, $InCl_3$, $ScCl_3$, $YCl_3$, $LaCl_3$, $CeCl_3$, $Al(NO_3)_3$, $Ga(N_3)_3$, $In(NO_3)_3$, $SbCl_3$, $WCl_6$, $Sc(NO_3)_3$, $Y(NO_3)_3$, $La(NO_3)_3$, $Ce(NO_3)_3$ may be preferably used because these compounds have high solubility with water and alcohol.

For example, chloride, nitrate, etc., of alkali metals (lithium, sodium, potassium, rubidium, cesium, francium), which are soluble in alcohol, may be used as an alkali metal compound that is the above-described constituent (c). In further detail, metal compounds such as LiCl, NaCl, KCl, RbCl, CsCl, FrCl, etc., may be preferably used since these compounds have high solubility with water or alcohol.

An alkaline earth metal compound that is the above-described constituent (e) is not requisite. However, for example, chloride, nitrate, etc., of alkaline earth metals (beryllium, magnesium, calcium, strontium, barium, radium) that can be soluble with alcohol may be used as the constituent (e) . In further detail, metal compounds such as $BeCl_2$, $MgCl_2$, $Mg(NO_3)_2$, $CaCl_2$, $Ca(NO_3)_2$, $SrCl_2$, $BaCl_2$, $RaCl_2$, $Ba(NO_3)_2$ may be preferably used since these compounds have high solubility with water and alcohol.

As to organic metal compounds having a non-hydrolyzable organic group that is the consituent (a) according to the invention, for example, compounds in which a part of anion of metal compounds of those described as the above-described constituent (d), that is, silicon, titanium, zirconium, aluminum, germanium, tantalum, antimony, tin, cerium, lanthanum, tungsten, and indium is substituted by a non-hydrolyzable organic group may be preferably used. Either of these metals is a cation atom that is able to form oxide networks. The non-hydrolyzable organic group is not specially limited. However, alkyl groups such as a methyl group, ethyl group, isopropyl group, etc., phenyl groups, vinyl groups, aminopropyl groups, acryl groups, epoxy groups, and further fluoroalkyl groups, chloroalkyl groups, etc., in which a part or all of hydrogen of a hydrocarbon, is substituted, may be listed as non-hydrolyzable organic groups. These organic groups remain in an organic-inorganic composite film, and provide the film with various features such as water repellency, a low friction property, and hydrophilicity. An organic silicon compound having such a non-hydrolyzable organic group can be obtained as a comparatively stable compound, wherein these compounds are preferably employed.

For example, the following may be listed as silane compounds having an alkyl group:

alkyl group-contained chlorosilane such as: $CH_3(CH_2)_{18}SiCl_3$, $CH_3(CH_2)_{16}SiCl_3$, $CH_3(CH_2)_2SiCl_3$, $CH_3CH_2SiCl_3$, $(CH_3CH_2)_2SiCl_2$, $(CH_3CH_2)_3SiCl$, $CH_3SiCl_3$, $(CH_3)_2SiCl_2$, $(CH_3)_3SiCl$ alkyl group-contained alkoxysilane such as: $CH_3(CH_2)_{18}Si(OCH_3)_3$, $CH_3(CH_2)_{16}Si(OCH_3)_3$, $CH_3(CH_2)_8Si(OCH_3)_3$, $CH_3(CH_2)_7Si(OCH_3)_3$, $CH_3(CH_2)_2Si(OCH_3)_3$, $CH_3CH_2Si(OCH_3)_3$, $(CH_3CH_2)_2Si(OCH_3)_2$, $(CH_3CH_2)_3SiOCH_3$, $CH_3Si(OCH_3)_3$, $(CH_3)_2Si(OCH_3)_2$, $(CH_3)_3SiOCH_3$, $CH_3(CH_2)_{18}Si(OC_2H_5)_3$, $CH_3(CH_2)_{16}Si(OC_2H_5)_3$, $CH_3(CH_2)_8Si(OC_2H_5)_3$, $CH_3(CH_2)_7Si(OC_2H_5)_3$, $CH_3(CH_2)_2Si(OC_2H_5)_3$, $CH_3CH_2Si(OC_2H_5)_3$, $(CH_3CH_2)_2Si(OC_2H_5)_2$, $(CH_3CH_2)_3SiOC_2H_5$, $CH_3Si(OC_2H_5)_3$, $(CH_3)_2Si(OC_2H_5)_2$, $(CH_3)_3SiOC_2H_5$, end methoxylpolydimethylsiloxane such as $CH_3O(Si(CH_3)_2O)_nCH_3$, (herein, n is 2 through 2000), and end silanolpolydimethylsiloxane such as $HO(Si(CH_3)_2O)_nH$ (herein, n is 2 through 2000), etc., The following may be listed as a silane compound having a fluoroalkyl group:

fluoroalkyl group-contained trichlorosilane such as $CF_3(CF_2)_9(CH_2)_2SiCl_3$, $CF_3(CF_2)_7(CH_2)_2SiCl_3$, $CF_3(CF_2)_5(CH_2)_2SiCl_3$, $CF_3(CF_2)_3(CH_2)_2SiCl_3$, $CF_3CF_2(CH_2)_2SiCl_3$, $CF_3(CH_2)_2SiCl_3$; and Fluoroalkyl group-contained trialkoxysilane such as $CF_3(CF_2)_9(CH_2)_2Si(OCH_3)_3$, $CF_3(CF_2)_7(CH_2)_2Si(OCH_3)_3$, $CF_3(CF_2)_5(CH_2)_2Si(OCH_3)_3$, $CF_3(CF_2)_3(CH_2)_2Si(OCH_3)_3$, $CF_3CF_2(CH_2)_2Si(OCH_3)_3$, $CF_3(CH_2)_2Si(OCH_3)_3$.

By employing these fluoroalkyl group-contained silane compounds, it is possible to render the surface of a substrate to have water repellency. Further, where trichlorosilane, trialkoxysilane, etc., that have a fluoroalkyl group including ten or more fluorine atoms are used, the film can be concurrently provided with excellent water repellency and durability features. In particular, $CF_3(CF_2)_7(CH_2)_2Si(OCH_3)_3$ (heptadecafluorodecyltrimethoxysilane) and $CF_3(CF_2)_7(CH_2)_2SiCl_3$ (heptadecafluorodecyltrichlorosilane) may be preferably used.

Acid that is a constituent (b) of the coating composition according to the invention is not specially limited. However, it is preferable that those which hardly remain in the mebrane during drying can achieve a film having high hardness. For example, hydrochloric acid, nitric acid, acetic acid, hydrofluoric acid, formic acid, trifluoroacetic acid, etc., may be listed. Among these, hydrochloric acid having a high degree of electrolytic dissociation and volatility, which is comparatively easy to be handled, is particularly preferable. It is preferable that the above-described constituent (b) is contained at a normality of 0.001 through 3.

A solvent whose boiling point is 150° C. or less at atmospheric pressure may be widely used as a solvent for the invention. For example, a hydrocarbon such as hexane, toluene, and cyclohexane, halogenated hydrocarbon such as methyl chloride, carbon tetrachloride, and trichloroethylene, ketone such as acetone, methylethylketone, nitrogen-contained compound such as dethyleamine, ester such as acetic ethyl, and alcohol, etc., may be used. Among these, alcohol-based solvents may be preferably used. For example, methanol, ethanol, 1-propanol, 2-propanol, buthyl alcohol, amyl alcohol, etc., may be listed. Chain saturated monovalent alcohol whose carbon number is 3 or less such as methanol, ethanol, 1-propanol, and 2-propanol, may be preferably used since the same has a large evaporation rate at normal temperature.

The above-described alcohol may contain water at a ratio of 0% or more by weight but 50% or less by weight. The highest-quality alcohol that is available on the market usually contains water at 0.2% or more by weight. The alcohol may be preferably used for the invention without any processing such as a dehdyrating process that results in an increase in costs. Also, when doping metal materials, a metal compound be dissovled in water and doped in advance, or other solvents may be doped in order to control the drying rate and viscosity of the liquid. At this time, it is preferable that the amount of the above-described chain saturated monovalent alcohol whose carbon number is 3 or less is equal to or exceeds 10% by weight with respect to the amount of a solvent. If the amount is less than the above, there may be a case where no uniform and transparent film can be obtained.

In a coating composition (coating solution) containing the above constituents (a) through (e), with respect to the above-described constituents (a) and (d), a hydrolyzing reaction and a dehydrating condensation reaction advance, dependent upon the catalyst constituent (b) and slight water in the solvent. Wherein a great deal of water exists in the coating solution, the hydrolyzing reaction and dehydratating condensation reaction of the above-described constituents (a) and (d) are fostered, the pot life of the coating liquid becomes short, and the film thickness may likely become uneven when being dried after the coating liquid is sprayed. Therefore, in order to lengthen the pot life of the solution and eliminate unevenness of the film thickness when being dried after coating, it is preferable that the concentration of water in the coating solution is made as slight as possible. Alcohol that is available on the market usually contains water of 0.2% or more by weight. The water content is sufficient in the invention. However, where water is further doped, it is preferable that the concentration of water is 0 through 5% by weight with respect to the coating solution, and 0 through 2% by weight is further preferable. Even if the concentration of water in the coating solution is zero, there is no case where the hydrolyzing reaction is hindered since a coating film after being coated on a substrate can absorb water or humidity in the air.

The coating method for the invention is not specially limited. However, for example, dip coating, flow coating, curtain coating, spin coating, spray coating, bar coating, roll coating, brush coating, etc., may be listed.

Coating in the invention is carried out at an ambient temperature ranging from 0 through 40° C., for example, at room temperature, with relative humidity of 40% or less. Drying after coating is carried out at an ambient temperature ranging from 0 through 40° C. with relative humidity of 40% or less for 10 seconds through 20 minutes at room temperature. Thereafter, as necessary, heating may be carried out at a temperature, which is higher than room temperature but including or less than 300° C., for 30 seconds through 10 minutes. Therefore, it is possible to obtain a film of high hardness, which has peculiar functionality as organic groups, without decomposing the organic groups that constitute the film. If heating is carried out at a temperature of 300° C. or less, which is higher than room temperature after the above-described coating is completed where organic groups having functionality are water repellent groups, a water drops rolling property and an ultraviolet ray resisting property of a film obtained may be likely to be lowered. Therefore, it is preferable that drying is carried out at room temperature after coating is completed.

Various types of plate-like or bar-like transparent or non-transparent materials of glass, ceramic, plastic or metal, etc., may be listed as a substrate for the invention. Where there are a few hydrophilic groups on the surface of the substrate, it is preferable that surface treatment is carried out after the surface is treated to become hydrophilic by processing the same in a plasma or corona atmosphere including oxygen in advance or by irradiating an ultraviolet ray, whose wavelength is around 200 through 300 nm, in an atmosphere including oxygen.

BEST MODE FOR CARRYING OUT THE INVENTION

A detailed description is given of embodiments with reference to the following examples.

Embodiment 1

Heptadecafluorodecyltrimethoxysilane $(CF_3(CF_2)_7(CH_2)_2 Si(O CH_3)_3$ produced by Shinetsu Silicone, hereinafter called "FAS") of 0.2 grams, tetraethoxysilane $(Si(OCH_2CH_3)_4$ produced by Shinetsu Silicone, hereinafter called "TEOS") of 0.6 grams, lithium chloride of 0.00947 grams, and concentrated hydrochloric acid (35% by weight) of 2 grams are doped to ethanol (whose water content is 0.35% by weight) of 999.19 grams while agitating the same, and FAS and TEOS are hydrolyzed to obtain a coating solution. Respective contents of FAS, TEOS and lithium chloride, which are metal compounds in the coating solution, are shown in Table 1 in terms of mole fraction where the total amount thereof is assumed to be 100 mol %. The coating solution is coated by a flow coating method on a washed glass substrate (3.4 mm×150 mm×150 mm) of a soda lime silicate glass composition at room temperature (20° C.) with relative humidity of 30%, and is dried at room temperature (20° C.) with relative humidity of 30% for approx. one minute, whereby the organic-inorganic composite film-coated glass plate on which a water repellent film of a thickness of approx. 40 nm is coated is obtained. Mole fraction of alkali metal atoms with respect to the total of cation atoms (silicon) and alkali metal atoms (lithium), which constitute an inorganic oxide of the obtained organic-inorganic composite film is as shown in Table 1.

In connection with the obtained organic-inorganic composite film-coated glass plate having a water repellent feature, a water contact angle was measured by using a water drop having a weight of 2 mg, by a contact angle gauge (CA-DT, produced by Kyowa Surfactant Chemistry, K.K) as a static contact angle. It is indicated that the larger the contact angle is, the more excellent the static water repellent feature is. Also, as to a scale showing performance (water drops rolling property) of a water drop rolling on the surface of coated glass having water repellency, a tilt angle (critical tilt angle) of a glass plate was measured at a moment when a water drop of 50 μl placed on the surface of the coated glass plate disposed horizontally began rolling when gradually inclining the glass plate. The smaller the critical tilt angle is, the more excellent the dynamic water repellency feature is, wherein precipitation (raindrops) adhered to a front glass window of a running vehicle becomes easily splashed, and visibility of a driver is not hindered.

Further, with respect to evaluation of the hardness of a film, abrasion was carried out 100 times at a weight of 250 grams on an organic-inorganic composite film-coated glass plate by using a taber abrasion test, which is available on the market, and the static contact angle in regard to a water drop of 2 mg described above was measured.

Contact angles of an organic-inorganic composite film having water repellency and contact angles before and after the taber abrasion test are shown in Table 2. With respect to the obtained film, the contact angle was large to be 108 degrees before the taber test, and was 90 degrees after the taber test. A decrease in the contact angle was slight before and after the taber test, and the film hardness was very high. Also, the water drop rolling property was 8 degrees in terms of the critical tilt angle.

If contact angles of an organic-inorganic composite film having water repellency and contact angles before and after the taber abrasioning test is not so changed, it is said that hardness and durability of the organic-inorganic composite film of the invention are very high.

Embodiments 2 through 10

Organic-inorganic composite film-coated glass having water repellency was obtained as in Embodiment 1, excepting that materials of metal compounds and the constituent ratios thereof in the coating solution of Embodiment 1 were modified as in Table 1. Thickness of the organic-inorganic composite films was in a range from 5 through 50 nm in any one of Embodiments 2 through 10. Cation composition of the obtained film, that is, mole fraction of alkali metal atoms or alkaline earth metal atoms with respect to the total of cation atoms, alkali metal atoms, and alkaline earth metal atoms, which constitute inorganic oxide networks of the organic-inorganic composite film was as in Table 1. Results measured as in Embodiment 1 are shown in Table 2.

Either of the obtained films had high hardness, wherein the contact angle thereof was large before the taber test and a lowering in the contact angle was slight after the taber test. Where Embodiment 3 in which no alkaline earth metal oxide is contained is compared with Embodiment 4 in which a part of alkali metal oxides in Embodiment 3 was substituted with alkaline earth metal oxides, it is found that Embodiment 4 is superior to Embodiment 3 in view of a abrasion resisting property and a water drop rolling property.

COMPARATIVE EXAMPLES 1 THROUGH 5

Organic-inorganic composite film-coated glass having water repellency was obtained as in Embodiment 1, excepting that materials of metal compounds and the amounts of doping thereof in the coating solution of Embodiment 1 were modified as in Table 1. Composition of cation of the obtained film was as in Table 1. Results measured as in Embodiment 1 are shown in Table 2.

Although the obtained film had a large contact angle before the taber test, a lowering in the contact angle was increased after the taber test, wherein almost no water repellency is left over, and the film hardness was very low.

Embodiment 11

End silanolpolydimethylsiloxane (produced by Gelest, Weight average molecular weight: 4200) was used as a metal compound having a nonreacting organic group in the coating solution for Embodiment 1, and organic/inorganic composite film-coated glass having a low friction feature was obtained as in Embodiment 1, excepting that the material of the metal compound and the amount of doping thereof were, respectively, changed as in Table 1. However, the constituent ratio and respective mole fractions are expressed in terms of mole numbers in which the content of the end silanolpolydimethylsiloxane (Weight average molecular weight: 4200) is converted to $SiO_2$. The composition of cation of the obtained film was as shown in Table 1.

Also, dynamic friction coefficients of the paper and film surface were measured by using a surface measuring instrument (HEIDON-14) produced by Shinto Kagaku, Ltd. It was found that the surface having very small friction resistance, whose friction coefficient is 0.1 or less, was obtained. The obtained film was a film having high hardness, whose contact angle before the taber test is large and a lowering in the contact angle after the taber test is small, as shown in Table 2. Further, when the friction coefficient was measured after the taber test, the friction coefficient thereof was a very small value to be 0.1 or less as before the taber test.

COMPARATIVE EXAMPLE 6

The amounts of use of LiCl and $MgCl_2.6H_2O$, which were used in the coating solution for Embodiment 9, were made into zero, excepting that DMS and TEOS were changed as shown in Table 1 and organic-inorganic composite film-coated glass having a low friction feature was obtained as in Embodiment 9. Although the obtained film had a large contact angle before the taber test, a lowering in the contact angle after the taber test was large. Almost all of the water repellency was lost, and film hardness was low.

Also, dynamic friction coefficients of the paper and film surface were measured before and after the taber test as in Embodiment 9. The friction coefficient after the taber test was increased to 0.5 although a surface having very low friction resistance, whose friction coefficient before the taber test was 0.1 or less, was obtained.

TABLE 1

| Materials of metal compounds | Constituent ratio (Molar ratio) | Alkali metals Type | Alkali metals Content (mol %) | Alkali earth metals Type | Alkali earth metals Content (mol %) |
|---|---|---|---|---|---|
| Embodiment | | | | | |
| 1 FAS/TEOS/LiCl | 10/83/7 | Li | 7 | — | 0 |
| 2 FAS/TEOS/CsCl | 5/87/8 | Cs | 8 | — | 0 |
| 3 FAS/TEOS/LiCl | 10/80/10 | Li | 10 | — | 0 |
| 4 FAS/TEOS/LiCl/$MgCl_2.6H_2O$ | 10/80/7/3 | Li | 7 | Mg | 3 |
| 5 FAS/LiCl/$CaCl_2.2H_2O$ | 98/1/1 | Li | 1 | Ca | 1 |
| 6 FAS/CsCl/$MgCl_2.6H_2O$ | 50/25/25 | Cs | 25 | Mg | 25 |
| 7 FAS/TEOS/CsCl/$CaCl_2.6H_2O$ | 10/88/1/1 | Cs | 1 | Ca | 1 |
| 8 FAS/$ZrOCl_2.8H_2O$/KCl | 10/80/10 | K | 10 | — | 0 |
| 9 FAS/$H_3BO_3$/NaCl/$CaCl_2.2H_2O$ | 50/40/5/5 | Na | 5 | Ca | 5 |
| 10 FAS/LiCl | 95/5 | Li | 5 | — | 0 |
| 11 DMS/TEOS/LiCl/$MgCl_2.6H_2O$ | 1/89/7/3 | Li | 7 | Mg | 3 |
| Comparative examples | | | | | |
| 1 FAS | 100 | — | 0 | — | 0 |
| 2 FAS/TEOS | 10/90 | — | 0 | — | 0 |
| 3 FAS/TEOS/LiCl | 10/50/40 | Li | 40 | — | 0 |
| 4 FAS/TEOS/CsCl/$MgCl_2.6H_2O$ | 5/15/40/40 | Cs | 40 | Mg | 40 |
| 5 FAS/TEOS/$CaCl_2.6H_2O$ | 10/80/10 | — | 0 | Ca | 10 |
| 6 DMS/TEOS | 1/99 | — | 0 | — | 0 |

*FAS: $F(CF_2)_8(CH_2)_2Si(OCH_3)_3$,
TEOS: $Si(OC_2H_5)_4$,
DMS: End silanolpolydimethylsiloxane (Weight average molecular weight: 4200)

TABLE 2

| | Contact angle (deg.) before abration test | Contact angle (deg.) after abration test | Critical tilt angle (deg.) |
|---|---|---|---|
| Embodiment 1 | 108 | 90 | 8 |
| Embodiment 2 | 108 | 95 | 7 |
| Embodiment 3 | 108 | 85 | 6 |
| Embodiment 4 | 108 | 89 | 4 |
| Embodiment 5 | 108 | 91 | 6 |
| Embodiment 6 | 108 | 96 | 6 |
| Embodiment 7 | 108 | 98 | 5 |
| Embodiment 8 | 108 | 92 | 8 |
| Embodiment 9 | 108 | 90 | 8 |
| Embodiment 10 | 107 | 88 | 9 |
| Embodiment 11 | 100 | 88 | 4 |
| Comparative Example 1 | 108 | 60 | 10 |
| Comparative Example 2 | 108 | 73 | 9 |
| Comparative Example 3 | 108 | 75 | 10 |
| Comparative Example 4 | 108 | 78 | 12 |
| Comparative Example 5 | 108 | 76 | 13 |
| Comparative Example 6 | 100 | 78 | 10 |

INDUSTRIAL APPLICABILITY

As described above, according to the invention, by containing alkali metal ions in an organic-inorganic composite film, it is possible to obtain an organic-inorganic composite film whose hardness is increased in epoch-making proportions. Also, by containing alkaline earth metal ions in an organic/inorganic composite film together with the alkali metal ions, it is possible to further improve the functionality of the organic groups along with increasing the hardness of the film.

What is claimed is:

1. A coated article comprising:
    a substrate and
    an organic-inorganic composite film, which is coated on the surface of said substrate, and has an oxide of a cation atom capable of forming an oxide network, and having a part of an oxygen of said oxide substituted by an organic group, wherein said organic-inorganic composite film includes
    alkali metal oxides at a ratio of 0.1 through 30% of the total number of said alkali metal atoms and said cation atoms expressed in terms of the number of said alkali metal atoms,
    and further includes alkaline earth metal oxides at a ratio of 0.1 through 30% of the total number of said alkaline metal atoms, said alkaline earth metal atoms, and said cation atoms expressed in terms of the number of said alkaline earth metal atoms.

2. The coated article as set forth in claim 1, wherein said organic-inorganic composite film includes said organic groups at a ratio which is 0.001 times or more but less than two times the total number of said alkaline metal atoms, alkali earth metal atoms, and said cation atoms expressed in terms of the number of said organic groups.

3. The coated article as set forth in any one of claims 1 or 2, wherein 50 through 100% of the total number of said organic groups are alkyl groups and/or fluoroalkyl groups.

4. The coated article as set forth in any one of claims 1 or 2, wherein said oxides of cation atoms capable of forming said oxide network is a silicon oxide.

5. The coated article as set forth in claim 3 wherein said oxides of cation atoms capable of forming said oxide network is a silicon oxide.

* * * * *